United States Patent

McLeod

(10) Patent No.: US 8,114,932 B2
(45) Date of Patent: Feb. 14, 2012

(54) NEUTRALIZER MODIFIED PROPYLENE BASED POLYMERS AND PROCESSES OF FORMING THE SAME

(75) Inventor: Michael McLeod, Kemah, TX (US)

(73) Assignee: Fina Technology, Houston, TX (US)

( * ) Notice: Subject to any disclaimer, the term of this patent is extended or adjusted under 35 U.S.C. 154(b) by 148 days.

(21) Appl. No.: 12/615,404

(22) Filed: Nov. 10, 2009

(65) Prior Publication Data

US 2011/0112231 A1    May 12, 2011

(51) Int. Cl.
*C08F 110/06* (2006.01)
*C08K 5/098* (2006.01)
*C06F 210/06* (2006.01)

(52) U.S. Cl. ........ 524/285; 524/321; 524/394; 524/401; 524/582; 526/351; 526/348

(58) Field of Classification Search .................. 526/351, 526/348; 524/285, 321, 394, 582, 401
See application file for complete search history.

(56) References Cited

U.S. PATENT DOCUMENTS

| | | | |
|---|---|---|---|
| 5,912,292 A | 6/1999 | Sun | |
| 6,060,545 A | 5/2000 | Gilg | |
| 6,465,551 B1 | 10/2002 | Zhao | |
| 6,521,685 B1 | 2/2003 | Zhao | |
| 6,887,963 B2 * | 5/2005 | Dotson | 526/351 |
| 6,936,650 B2 | 8/2005 | Mannion | |
| 6,946,507 B2 | 9/2005 | Mannion | |
| 2006/0155073 A1 * | 7/2006 | Oobayashi et al. | 525/242 |
| 2010/0004378 A1 | 1/2010 | Ommundsen et al. | |
| 2010/0233456 A1 | 9/2010 | Oobayashi et al. | |

OTHER PUBLICATIONS

Hyperform HPN-68—high speed nucleating agent for polypropylene.*
Hyperform HPN-68 High Speed Nucleating Agent for Polypropylene, Milliken Chemical.
Halstead et al: "A New Look at Nucleating Agents for Use in Polypropylene Color Concentrates".
Hyperform HPN-68, "High Speed Nucleating Agent for Polypropylene", Milliken Chemical, Jun. 2003 (8 pages).
Halstead et al., "A New Look at Nucleating Agents for Use in Polypropylene Color Concentrates", Milliken & Co., Jul. 2007 (13 pages).

* cited by examiner

*Primary Examiner* — Ling Choi

(57) ABSTRACT

Polymer articles formed from a modified propylene based polymer and processes of forming the same are described herein. The modified propylene based polymers generally include a propylene based polymer, a nucleator including a hyper nucleator, and a neutralizer composition, wherein the neutralizer composition includes a first compound selected from stearoyl lactylates, lactates, hydrotalcites, hydroxides and combinations thereof and may optionally include a second compound selected from metal stearates, wherein the lactates are selected from modified calcium salts derived from stearic and lactic acids and calcium lactates.

19 Claims, 1 Drawing Sheet

NEUTRALIZER MODIFIED PROPYLENE BASED POLYMERS AND PROCESSES OF FORMING THE SAME

FIELD

Embodiments of the present invention generally relate to modified propylene based polymers.

BACKGROUND

Nucleation of propylene based polymers for processing applications, such as in injection molding, sheet forming and solid-state terming may provide processing efficiencies. However, such nucleation can result in degradation in article properties, such as differential shrinkage and reduced optical properties. Accordingly, it is desired to provide polymers and processes of forming the same, wherein nucleation is utilized to improve processing while maintaining or improving the polymer properties in the polymer article.

SUMMARY

Embodiments of the present invention include polymer articles formed from a modified propylene based polymer. The modified propylene based polymers generally include a propylene based polymer, a nucleator including a hyper nucleator, and a neutralizer composition wherein the neutralizer composition includes a first compound selected from stearoyl lactylates, lactates, hydrotalcites, hydroxides and combinations thereof and may optionally include a second compound selected from metal stearates, wherein the lactates are selected from modified calcium salts derived from stearic and lactic acids and calcium lactates.

In one or more embodiments, the first compound includes the lactate and the hydrotalcite.

In one or more of the above embodiments, the modified propylene based polymer exhibits a crystallization temperature that is at least 2° C. greater than the crystallization temperature of a propylene based polymer wherein the neutralizer composition includes only the metal stearate.

In one or more of the above embodiments, the neutralizer composition includes from about 0.002 wt. % to about 0.8 wt. % of the modified propylene based polymer.

In one or more of the above embodiments, the polymer article exhibits a haze per mil of article thickness of less than 0.9%/mil when the article includes a thickness of 60 mils or less.

In one or more of the love embodiments, the polymer article exhibits a gloss of at least 70%.

In one or more of the above embodiments, the hyper nucleator includes disodium bicyclo[2,2,1]heptane-2,3-dicarboxylate.

In one or more of the above embodiments, the metal stearate is selected from calcium stearate and zinc stearate.

In one or more of the above embodiments, the article is an injection molded article.

One or more embodiments further include processes of forming polymer articles. The processes generally include providing the modified propylene based polymer and firming the modified propylene based polymer into a polymer article.

In one or more of the above, embodiments, the article is an injection molded article.

In one or more of the above embodiments the article is selected from tapes and biaxially oriented films.

DETAILED DESCRIPTION

Introduction and Definitions

Figure 1:
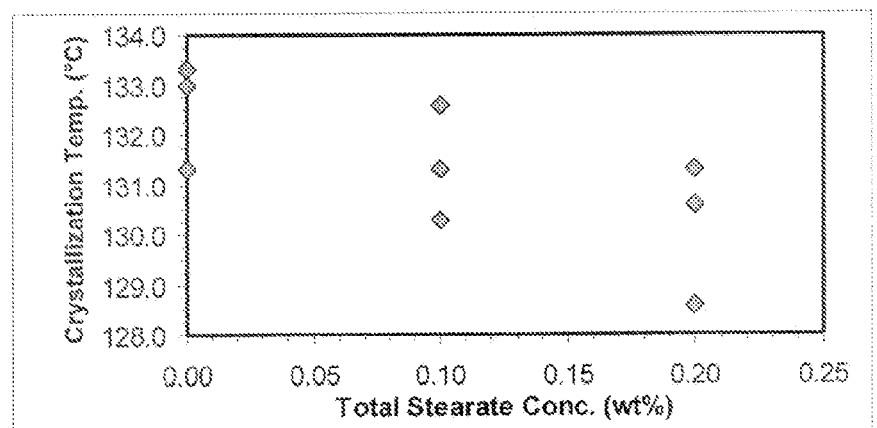
FIG. 1 illustrates peak crystallization temperature vs. stearate concentration of various polymer samples.

A detailed description will, now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in or more, but not necessarily the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

Polymer articles formed from modified propylene based polymers are described herein. The modified propylene bused polymers provide for polymer articles having improved properties.

Catalyst System

Catalyst systems useful for polymerizing; olefin monomers include any suitable catalyst system. For example, the catalyst system max include chromium based catalyst systems, single site transition metal catalyst systems including metallocene catalyst systems; Ziegler-Natta catalyst systems or combinations thereof, for example. The catalysts may be activated for subsequent polymerization and may or may not be associated with a support material, for example. A brief discussion of such catalyst systems is included below, but is in no way intended to limit the scope of the invention to such catalysts.

For example, Ziegler-Natta catalyst systems are generally formed from the combination of a metal component (e.g., a catalyst) with one or more additional components, such as a catalyst support, a cocatalyst and/or one or more electron donors, for example.

Metallocene catalysts may be characterized generally as coordination compounds incorporating one or more cyclopentadienyl (Cp) groups (which may be substituted or unsubstituted, each substitution being the same or different) coordinated with a transition metal through $\pi$ bonding. The substituent groups on Cp may be linear, branched or cyclic hydrocarbyl radicals, for example. The cyclic hydrocarbyl radicals may further form other contiguous ring structures, including indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730, U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, to $C_4$ to $C_{18}$ diolefins, conjugated or nonconjugated dienes, polyenes, vinyl monomers and cyclic olefins, for example. Non-limiting examples of other monomers may include norbornene, norbornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,736,998 and U.S. Pat. No. 5,589,555, which are incorporated by reference herein.

One example of a gas phase polymerization process includes a continuous cycle system, wherein a cycling pas stream (otherwise known as a recycle stream or fluidizing medium) is heated in a reactor by heat of polymerization. The heat is removed from the cycling gas stream in another part of the cycle, by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C. or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,104; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane, (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be killed with circulating slurry of growing polymer particles in a diluent, for example. Optionally, hydrogen (or other chain terminating agents, for example) may be added to the process, such as for molecular weight control of the resultant polymer. The loop reactor may be maintained at a pressure of from about 27 bar to about 50 bar or from about 3 bar to about 45 bar and a temperature of from about 38° C. to about 121° C., for example. Reaction heat may be removed through the loop wall via any suitable method, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Upon removal from the reactor, the polymer may be passed to a polymer recovery system for further processing, such as addition of additives and/or extrusion, for example.

In particular, embodiments of the invention include modifying the polymer to form is modified polymer. The modification may occur by blending the polymer with one or more modifiers (i.e., "modification"), which may occur in the polymer recovery system or in another manner known to one skilled in the art. The modifiers generally include a nucleator and a neutralizer composition.

It is recognized that nucleators, such as sodium benzoate, are commonly used in numerous polypropylene structures, thereby providing benefits, such as improved processing, increased stiffness and improved clarity.

Embodiments of the invention utilize a hyper nucleator. As used herein, the term "hyper nucleator" refers to nucleators that that nucleate more rapidly than conventional nucleators and generally includes organic carboxylic acid, salts, such as Hyperform® nucleators, commercially available from Milliken & Co. In one specific, embodiment, the hyper nucleator includes disodium bicyclo[2,2,1]heptane-2,3-dicarboxylate.

In one or more embodiments, the modified polymer may include front about 200 ppm to about 800 ppm, or from about 300 ppm to about 700 ppm or from about 350 ppm to about 600 ppm hyper nucleator, for example.

Hyper nucleators generally provide for rapid nucleation, resulting in shortening of cycle times for injection molding. Unfortunately, the use of hyper nucleators can result in property degradation, such as shrinkage and decreasing optical properties. However, embodiments of the invention further include a neutralizer composition, thereby unexpectedly overcoming the property degradation described above. The neutralizer composition generally includes a first compound. The first compound may include stearoyl lactylates, lactates, hydrotalcites, hydroxides or combinations thereof, for example. The lactates may include modified calcium salts derived from stearic and lactic acids, and calcium lactates. For example, the lactate may include Pationic® series neutralizers (e.g., Pationic® 940, Pationic® 1230, Pationic® 1233, Pationic®1240 and Pationic® 1250, commercially available from American Ingredients Company, Patco Polymer Additives Division. In one or more specific embodiments, the lactate includes Pationic® 940. In one or more specific embodiments, the first compound includes both the lactate and the hydrotalcite.

In one or more embodiments, the modified polymer may include from about 0.002 wt. % to about 0.8 or from about 0.005 wt. % to about 0.5 or from about 0 wt % to about 0.2 wt. % to about 0.02 wt. % to about 0.1 neutralizer composition, for example.

In one or more embodiments, the neutralizer composition includes, from about 0 wt. % to about 100 wt. %, or from about 25 wt. % to about 75 wt % or from about 40 wt. % to about 60 wt. % hydrotalcite and from about 0 wt. % to 100 wt. %, or from about 25 wt. % to about 75 wt % or from about 40 wt. % to about 60 wt. % lactate, for example.

The neutralizer composition may optionally further include a second compound. The second compound generally includes metal stearates. For example, the metal stearate may include calcium stearate or zinc stearate.

The neutralizer composition may include from about 0 to about 85 wt %, or from about 75 to about 80 wt % or from about 60 wt. % to about 75 wt. % second compound, for example.

The modifiers may be blended with the polymer in any manner known to one skilled in the art. For example, one or more embodiments of the invention include omit blending the polymer with the modifiers.

It is contemplated that the modifiers may be formed into is "masterbatch" (e.g., computed with a concentration of masterbatch polymer, either the same or different from the polymer described above) prior to blending with the polymer. Alternatively, his contemplated that the modifier may be blended "neat" (e.g., without combination with another chemical) with the polymer. It is further contemplated that the hyper nucleator and the neutralizer composition may contact one another prior to contact with the polymer. However, it is also within the scope of this description that the neutralizer composition and hyper nucleator separately contact the polymer. Further, it is contemplated that when the neutralizer composition includes, both the first compound ruin the second compound, that the first compound and second compound may separately contact the hyper nucleator and/or the polymer.

Polymer Product

The polymers and blends thereof) formed via the processes described herein may include, but are not limited to polypropylene and polypropylene copolymers, for example. Unless otherwise designated herein, all testing methods are the current methods at the time of filing.

In one or more embodiments, the polymers include propylene based polymers. As used herein, the term "propylene based" is used interchangeably with the terms "propylene polymer" or "polypropylene" and refers to a polymer having at least about 50 wt. %, or at least about 70 or at least about 75 wt. % or at least about 80 wt. %, or at least about 85 wt. % or at least about 90 wt. % polypropylene relative to the total weight of polymer, for example.

In one embodiment, propylene based polymers may base a molecular weight ($M_w$) of 160,000 (as measured by gel permeation chromatography).

The propylene based polymers may have a melting point ($T_m$) as measured by DSC) of at least about 110° C., or from about 115° C. to about 175° C., for example.

The propylene based polymers may have a melting flow rate (MFR) as measured ASTM D-1238) of from about 0.01 dg/min to about 1000 dg/min., or from about 0.01 dg/min. to about 100 dg/min., for example.

In one or more embodiments, the polymers include polypropylene homopolymers. Unless otherwise specified, the term "polypropylene homopolymer refers to propylene homopolymers or those polymers composed primarily of propylene and amounts of other comonomers, wherein the amount of comonomer is insufficient to change the crystalline nature of the propylene polymer significantly.

In one or more embodiments, the polymers include propylene based random copolymers. Unless otherwise specified, the term "propylene based random copolymer" refers to those copolymers composed primarily of propylene and an amount of at least one comonomer, wherein the polymer includes at least about 0.5 wt. %, or at least about 0.8 wt. %, or at least about 2 wt. %, or from about 0.5 wt % to about 15 wt. %, or from about 0.6 to about 10 wt. % comonomer relative to the total weight of polymer, for example. The comonomers may be selected from $C_2$ to $C_{10}$ alkenes. For example, the comonomers may be selected from ethylene, propylene, 1-butene, 1-pentene, 1-hexene, 1-heptene, 1-octene, 1-nonene, 1-decene, 4-methyl-1-pentene and combinations thereof in one specific embodiment, the comonomer includes ethylene. Further, the term "random copolymer" refers to a copolymer formed of macromolecules in which the probability of finding, a given monomeric unit at any given site in the chain is independent of the nature of the adjacent units.

The propylene based random copolymers may exhibit a melt flow rate of at least about 2 dg./10 min., or from about 5 dg./10 min. to about 100 dg./10 min. or from about 10 dg./0 min. to about 40 dg./10 min., for example.

It has been observed that the embodiments described herein produce modified polymers exhibiting a crystallization temperature that is at least 1 or at least 2° C., or at least 3° C. or at least 4° C. greater than the crystallization temperature of a propylene based polymer wherein the neutralizer composition consists essentially of the metal stearate.

Product Application

The polymers and blends thereof are useful in applications known to one skilled in the art, such as forming operations (e.g. film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven, or non-woven form to make sacks, bags, rope, twine, carpet backing, carper yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

One or more specific embodiments of the invention include injection molding. It has been observed that the embodiments described herein are capable of forming an injection molded article exhibiting increased gloss compared to an identical polymer wherein the neutralizer composition consists essentially of the metal stearate. In addition, the injection molded articles exhibit a gloss of at least about 70%, or least about 75% or at least about 80% (measured by ASTM D2457 at 45°), for example.

One or more specific embodiments of the invention include utilizing the polymers in solid state stretch applications, such as thermoforming, drawn tape, drawn monofilament, mono direction oriented film, biaxially oriented film, solid state extrusion and injection stretch blow molding, for example. The use of the modifiers and processes described herein may be used in avoiding water carryover problems associated with the use of conventional additives in such processes while at the same time, prong benefits such as those described herein and in the examples below.

EXAMPLES

A propylene based polymer was compounded with varying modifier formulations. The propylene based polymer utilized was TOTAL PETROCHEMICALS 2662, commercially available from TOTAL PETROCHEMICALS USA, Inc. The formulations are shown below in Table 1.

TABLE 1

| Formulation # | Calcium Stearate (wt. %) | Zinc Stearate (wt. %) | Hydro-talcite (wt. %) | Pationic 940 (wt. %) |
|---|---|---|---|---|
| 1 | 0.2 | 0 | 0 | 0 |
| 2 | 0.1 | 0.1 | 0 | 0 |
| 3 | 0 | 0.2 | 0 | 0 |
| 4 | 0 | 0 | 0.075 | 0 |
| 5 | 0.1 | 0 | 0.0375 | 0 |
| 6 | 0 | 0.1 | 0.0375 | 0 |
| 7 | 0 | 0 | 0 | 0.06 |
| 8 | 0.1 | 0 | 0 | 0.03 |
| 9 | 0 | 0.1 | 0 | 0.03 |
| 10 | 0 | 0 | 0.0375 | 0.03 |

Figure 2:
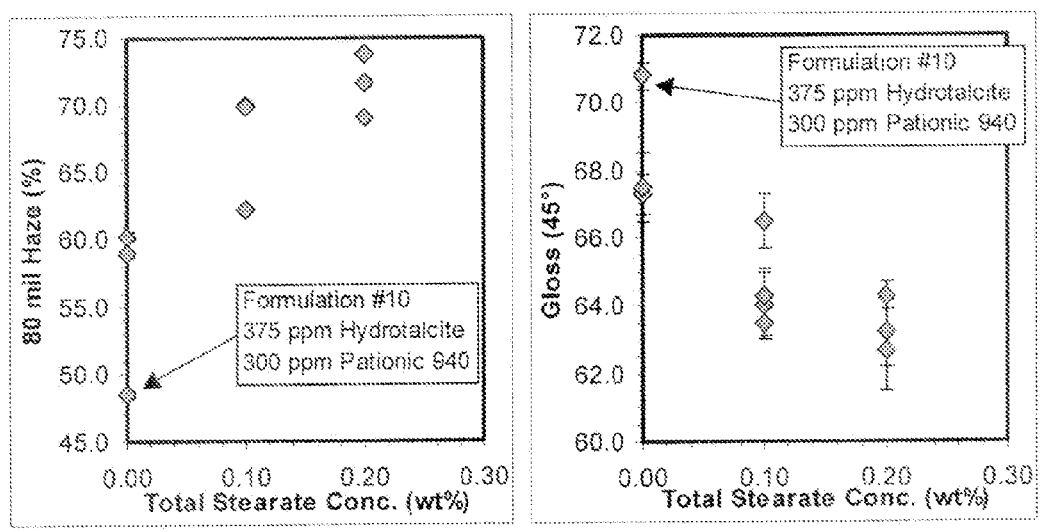
FIG. 2 illustrates haze vs. stearate concentration of various polymer samples.

It was observed that as calcium stearate or zinc stearate is replaced by either hydrotalcite or Pationic® 940, the trend is toward increased crystallization temperature, lower haze and greater gloss in the modified polymer, which is shown in FIGS. 1 and 2 and the numerical results follow in Table 2.

TABLE 2

| Form. # | 20 mil haze (%) | 40 mil haze (%) | 60 mil haze (%) | 80 mil haze (%) | $T_c$ (° C.) | Gloss (45°) |
|---|---|---|---|---|---|---|
| 1 | 20.9 | 43.7 | 64.0 | 73.8 | 131.3 | 62.7 |
| 2 | 20.9 | 43.0 | 63.2 | 71.6 | 130.6 | 63.2 |
| 3 | 22.8 | 41.1 | 60.3 | 69.1 | 128.6 | 64.3 |
| 4 | 17.5 | 33.0 | 51.4 | 60.2 | 131.3 | 67.3 |
| 5 | 16.7 | 34.5 | 52.6 | 62.2 | 131.3 | 66.5 |
| 6 | 22.1 | 40.7 | 61.5 | 69.8 | 132.6 | 64 |
| 7 | 15.6 | 32.4 | 49.8 | 58.9 | 133.3 | 67.5 |
| 8 | 18.9 | 40.1 | 60.4 | 70.0 | 131.3 | 63.5 |
| 9 | 20.1 | 40.3 | 61.2 | 69.8 | 130.3 | 64.3 |
| 10 | 11.9 | 25.0 | 39.8 | 48.5 | 133 | 70.8 |

While the foregoing is directed to embodiments of the present invention, other and further embodiments of the invention may be devised without departing from the basic scope thereof and the thereof is determined by the claims that follow.

What is claimed is:

1. A polymer article formed from a modified propylene based polymer comprising:
   a propylene homopolymer or propylene-based random co-polymer;
   a nucleator comprising a hyper nucleator; and
   a neutralizer composition, wherein the neutralizer composition comprises a first compound selected from lactates, hydrotalcites, hydroxides and combinations thereof, wherein the lactates are selected from modified calcium salts derived from stearic and lactic acids and calcium lactates.

2. The polymer article of claim 1, wherein the first compound comprises the lactate and the hydrotalcite.

3. The polymer article of claim 1, wherein the modified propylene based polymer exhibits a crystallization temperature that is at least 2° C. greater than the crystallization temperature of a propylene based polymer wherein the neutralizer composition consists essentially of the metal stearate.

4. The polymer article of claim 1, wherein the neutralizer composition comprises from about 0.002 wt. % to about 0.8 wt. % of the modified propylene based polymer.

5. The polymer article of claim 1, wherein the polymer article exhibits a haze per mil of article thickness of less than 0.9%/mil when the article comprises a thickness of 60 mils or less.

6. The polymer article of claim 1, wherein the polymer article exhibits a gloss of at least 70%.

7. The polymer article of claim 1, wherein the hyper nucleator comprises disodium bicyclo[2,2,1]heptane-2,3-dicarboxylate.

8. The polymer article of claim 1, wherein the metal stearate is selected from calcium stearate and zinc stearate.

9. The polymer article of claim 1, wherein the neutralizer composition further comprises the metal stearate.

10. The polymer article of claim 9, wherein the polymer article exhibits increased gloss compared to an identical polymer wherein the neutralizer composition consists essentially of the metal stearate.

11. The polymer article of claim 1, wherein the article is an injection molded article.

12. A process of forming a polymer article comprising:
   providing a modified propylene based polymer comprising:
      a homopolymer or propylene-based random co-polymer;
      a nucleator comprising a hyper nucleator; and a neutralizer composition, wherein the neutralizer composition comprises a first compound, wherein the first compound is a lactate and a second compound selected from the group consisting of hydrotalcites, hydroxides and combinations thereof, wherein the lactate is selected from modified calcium salts derived from stearic and lactic acids and calcium lactates; and forming the modified propylene based polymer into a polymer article.

13. The process of claim 12, wherein the first compound comprises the lactate and the hydrotalcite.

14. The process of claim 12, wherein the modified propylene based polymer exhibits a crystallization temperature that is at least 2° C. greater than the crystallization temperature of a propylene based polymer wherein the neutralizer composition consists essentially of the metal stearate.

15. The process of claim 12, wherein the neutralizer composition comprises from about 0.002 wt. % to about 0.8 wt. % of the modified propylene based polymer.

16. The process of claim 12, wherein the polymer article exhibits a haze per mil of article thickness of less than 0.9%/mil when the article comprises a thickness of 60 mils or less.

17. The process of claim 12, wherein the polymer article exhibits increased gloss compared to an identical polymer wherein the neutralizer composition consists essentially of the metal stearate.

18. The process of claim 12, wherein the article is an injection molded article.

19. The process of claim 12, wherein the article is selected from tapes and biaxially oriented films.

* * * * *